US005973918A

United States Patent [19]
Felcman et al.

[11] Patent Number: 5,973,918
[45] Date of Patent: Oct. 26, 1999

[54] ALIGNED PIVOTING POWER SUPPLY TRAY AND GUIDED INPUT/OUTPUT TRAY FOR CONNECTION OF THE POWER SUPPLY AND INPUT/OUTPUT TO THE COMPUTER MOTHERBOARD

[75] Inventors: Francis A. Felcman, Rosenberg; Juan M. Perez, Tomball, both of Tex.

[73] Assignee: Compaq Computer Corporation, Houston, Tex.

[21] Appl. No.: 08/876,972

[22] Filed: Jun. 16, 1997

[51] Int. Cl.⁶ .............................. H05K 7/00; G06F 1/16
[52] U.S. Cl. ........................... 361/683; 361/752; 361/801; 361/725
[58] Field of Search ..................... 361/683–686, 361/724, 728, 726, 752, 784, 785, 796, 801, 802; 439/61, 59; 364/708.1

[56] References Cited

U.S. PATENT DOCUMENTS

| | | | |
|---|---|---|---|
| 1,352,924 | 9/1920 | Streich | 45/77.3 |
| 2,277,702 | 3/1942 | Kennedy | 45/77 |
| 2,658,101 | 11/1953 | Coxe, Jr. | 174/51 |
| 3,187,281 | 6/1965 | Weiner et al. | 334/82 |
| 3,779,623 | 12/1973 | Motohashi | 312/257 |
| 4,168,870 | 9/1979 | Hill | 312/223 |
| 4,356,531 | 10/1982 | Marino et al. | 361/384 |
| 4,479,198 | 10/1984 | Romano et al. | 364/900 |
| 4,479,263 | 10/1984 | Rowenfeldt et al. | 485/502 |
| 4,532,576 | 7/1985 | Reimer | 361/415 |
| 4,688,131 | 8/1987 | Noda et al. | 360/137 |
| 4,713,633 | 12/1987 | Saito et al. | 333/222 |
| 4,761,975 | 8/1988 | Kachnowski et al. | 70/232 |
| 4,772,079 | 9/1988 | Douglas et al. | 312/257 R |
| 4,920,453 | 4/1990 | Onose et al. | 361/392 |
| 4,979,075 | 12/1990 | Murphy | 361/686 |

(List continued on next page.)

FOREIGN PATENT DOCUMENTS

| | | | |
|---|---|---|---|
| 1.366.567 | 1/1964 | France . | |
| 1-194397 | 4/1989 | Japan | H05K 7/14 |
| 1-270399 | 10/1989 | Japan | H05K 9/00 |
| 659-165 | 4/1983 | Switzerland | H05K 7/18 |

OTHER PUBLICATIONS

Compaq Typhoon Mechanical Specification, Version 0.01, Nov. 8, 1994 by Joseph Allen, Systems Division of Compaq Computer Corporation, 15 pages.
IBM Technical Disclosure Bulletin, vol. 29 No. 9 Feb. 1987, Bridge Assembly for Mounting Interchangeable Electromagnetic Devices, 2 pages.

(List continued on next page.)

*Primary Examiner*—Leo P. Picard
*Assistant Examiner*—Jayprakash N. Gandhi
*Attorney, Agent, or Firm*—Akin, Gump, Strauss, Hauer & Feld, L.L.P.

[57] ABSTRACT

A system for automatically electrically connecting electronic components, such as an input/output board and a power supply, with a motherboard includes attaching in a tray with electronic components with a frame. In one embodiment, a tray is pivotably attached to a computer housing frame and a connector extends from the under side of the tray. As the tray is pivoted about its axis, the connector is engaged or disengaged from a connector fixedly mounted on the motherboard. The connector on the motherboard has a flexible funneled opening to facilitate insertion of the pivoting connector. In another embodiment, a tray with electronic components can be quickly disconnected from the motherboard by lifting the tray straight up guided by frame tracks. By lifting the tray, a series of leads mounted on the tray are disengaged from the slot connector mounted on the motherboard. Advantageously, a method for disconnecting electronic components from a motherboard in a computer frame is disclosed.

19 Claims, 4 Drawing Sheets

U.S. PATENT DOCUMENTS

| | | | |
|---|---|---|---|
| 5,020,768 | 6/1991 | Hardt et al. | 248/678 |
| 5,039,825 | 8/1991 | Samarov | 174/35 GC |
| 5,136,468 | 8/1992 | Wong et al. | 361/683 |
| 5,162,976 | 11/1992 | Moore et al. | 361/393 |
| 5,164,886 | 11/1992 | Chang | 361/390 |
| 5,175,669 | 12/1992 | Navia et al. | 361/683 |
| 5,197,789 | 3/1993 | Lin | 312/223.2 |
| 5,208,722 | 5/1993 | Ryan et al. | 360/99.01 |
| 5,216,907 | 6/1993 | Ullmann | 70/159 |
| 5,236,259 | 8/1993 | Ryan et al. | 312/244 |
| 5,262,923 | 11/1993 | Batta et al. | 361/685 |
| 5,277,615 | 1/1994 | Hastings et al. | 439/377 |
| 5,278,351 | 1/1994 | Herrick | 361/683 |
| 5,338,214 | 8/1994 | Steffes et al. | 361/683 X |
| 5,351,176 | 9/1994 | Smith et al. | 361/681 |
| 5,397,176 | 3/1995 | Allen et al. | 312/223.2 |
| 5,466,059 | 11/1995 | Liu | 361/683 X |
| 5,491,611 | 2/1996 | Stewart et al. | 361/736 |
| 5,495,389 | 2/1996 | Dewitt et al. | 361/683 |
| 5,544,006 | 8/1996 | Radloff et al. | 361/683 |
| 5,571,256 | 11/1996 | Good et al. | 211/26 |
| 5,600,538 | 2/1997 | Xanthopoulos | 361/683 |
| 5,653,518 | 8/1997 | Hardt | 312/334.4 |

OTHER PUBLICATIONS

IBM Technical Disclosure Bulletin, vol. 28, No. 12, May 1986, Spring–Loaded File Rails, 3 pages.

IBM Technical Disclosure Bulletin, vol. 30, No. 1, Jun. 1987, Direct–Access Storage Device Commodity–Stacking Plates, 2 pages.

IBM Technical Disclosure Bulletin, vol. 28, No. 6, Nov. 1985, Universal, Low–Cost Hard–File Mounting Assembly, 2 pages.

Photographs of a computer having a motherboard having a microprocessor positioned on a tray that is slidable relative to the frame of the computer housing as disclosed by Compaq Computer Corporation in Jul. of 1996, including:.

A 5×7 color photograph of a motherboard having a microprocessor positioned on a tray with the tray in the partially extended position relative to the frame of the housing.

A 5×7 color photograph of a perspective view (with the removable tray removed) of the motherboard having a microprocessor positioned on a tray partially extended relative to the frame of the housing.

A 5×7 color photograph of the frame of the housing as shown in above F1 and F2 with the tray with the motherboard completely removed so as to expose openings in the bottom of the frame of the housing.

A 5×7 color photograph of a drive unit in the extended position from the frame of the housing of F1, F2 and F3 where the openings in the frame are aligned with threaded bores in the drive unit for receiving screws having a "TORQ" head.

Photographs of a compute having a frame having a track member so that a tray having electronic components can be removable positioned with the frame and the electronic components are simultaneously connected with a board, while positioning the tray in the frame track,as disclosed by Compaq Computer Corporation in Jul. of 1996, including:.

A 5×7 color photograph of a perspective view of a frame of a housing having a motherboard theron, as shown in above photos F1, F2, F3 and F4.

A 5×7 color photograph of a removable tray supporting a card, where the tray is removed and positioned beside the housing.

A 5×7 color photograph of the removable tray being inserted into track members in the frame on one side of the housing.

A 5×7 color photograph of the removable tray being inserted in track members on the other side of the housing.

A 5×7 color photograph of an elevational view of the card of the removable tray after being initially received into the tracks of the housing, as shown in photos G3, G4 and F1, with the card being spaced apart from the slot (by a film container that is not part of the device).

A 5×7 color photograph (film overlapped) of the card of G5 photo being received into a slot for electrical connection upon moving the removable tray in the track members to its full down position.

Photographs of a computer having a drive tray that is pivotally attached to the frame of a computer housing. The drive tray, that holds floppy disc and hard drives, pivots upwardly approximately 45° to provide access to the drives. As can be seen, the drive tray is not positioned over a motherboard having a microprocessor or any other printed circuit board. Manufactured and distributed by Compaq Computer Corporation before Jun. 15, 1996, including:.

A 5×7 color photograph of a perspective view of the frame of the housing having a drive tray (that is pivotally attached to the frame of a computer housing) in the operating position.

A 5×7 color photograph of the drive tray pivoting upwardly approximately 45° to provide access to the drives.

A 5×7 color photograph showing another view of the drive tray pivoting upwardly approximately 45° to better shows that the drive tray is not positioned over a motherboard having a microprocessor or any other printed circuit board.

A 5×7 color photograph of another view of the drive tray in the pivoting position as shown in photos H2 and H3.

Dell® OptiPlex® Gxi Midsize Systems Reference and Installation Guide, ©1991–1996 Dell Computer Corporation. Sep. 1996 P/N 50577. In particular, see Fig. 1–2 "Security Cable Slot" on pp. 1–4; pp. 5–2 and 5–3 regarding Removing the Computer Cover; pp. 5–4 to 5–8 regarding "Inside Your Computer", pp. 5–11 regarding "Removing and Replacing the Expansion–Card Cage", pp. 5–11 and 5–12 regarding "Rotating the Power Supply Away from the System Board." and photos, including:.

A 5×7 color photograph shows the actuation of one of the buttons positioned on each side of the computer cover of the Dell® OptiPlex® Gxi Midsize Systems referred to in "I" above.

A 5×7 color photograph shows rotating the cover about the front of the computer upon releasing the engagement between the cover and the frame after being actuated by one of the buttons positioned on each side of the computer housing.

A 5×7 color photograph of the engagement means on the side of the computer frame shown in photo I2.

A 5×7 color photograph showing two overlapped photos—one of the engagement means inside of the computer cover for one of the buttons actuated in photographs I1 and I2. Also, overlapped is a photo of the bottom of the power supply that has no power connection, as referred to on pp. 5–11 and 5–12 of "I" regarding "Rotating the Power Supply Away from the System Board".

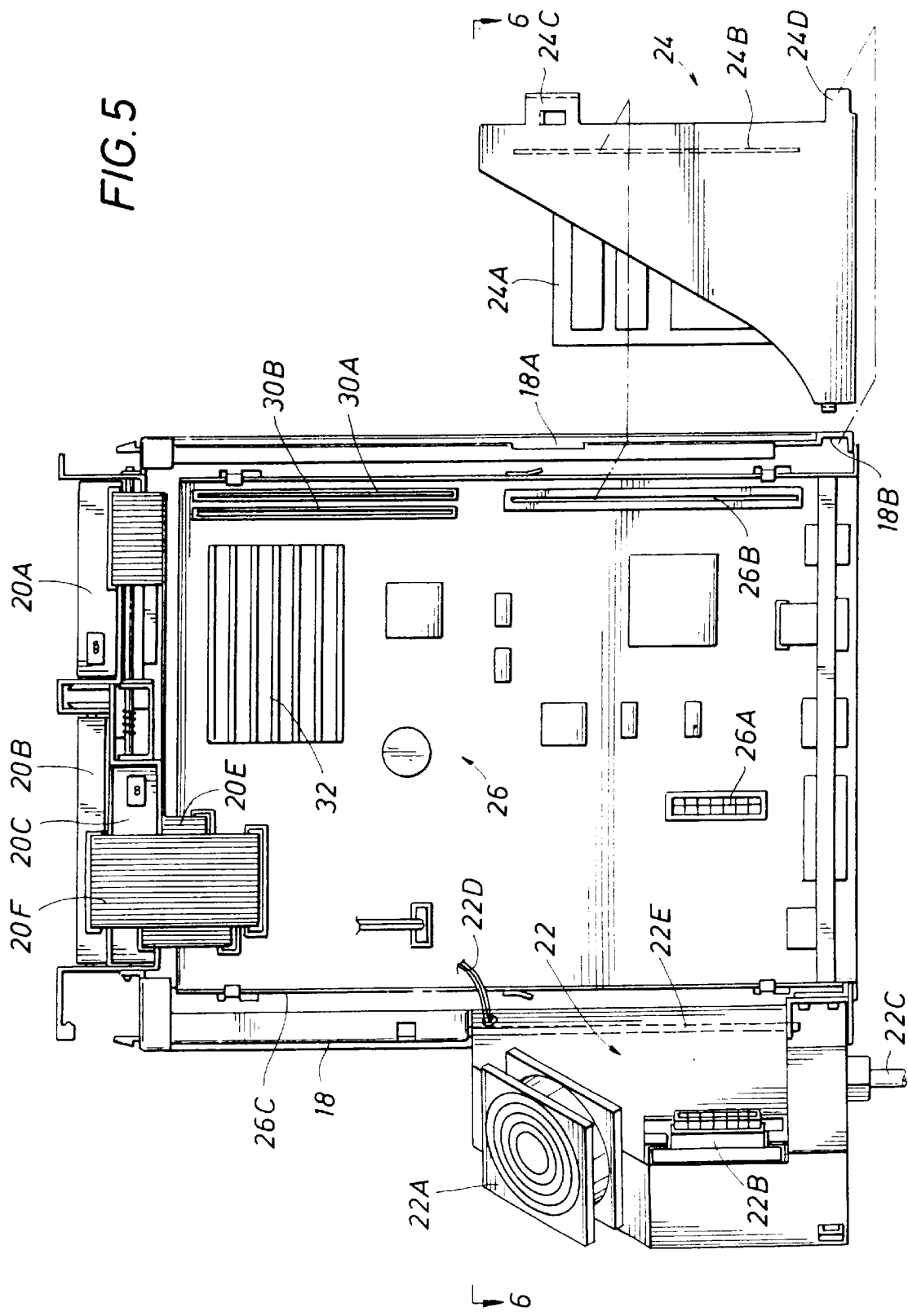

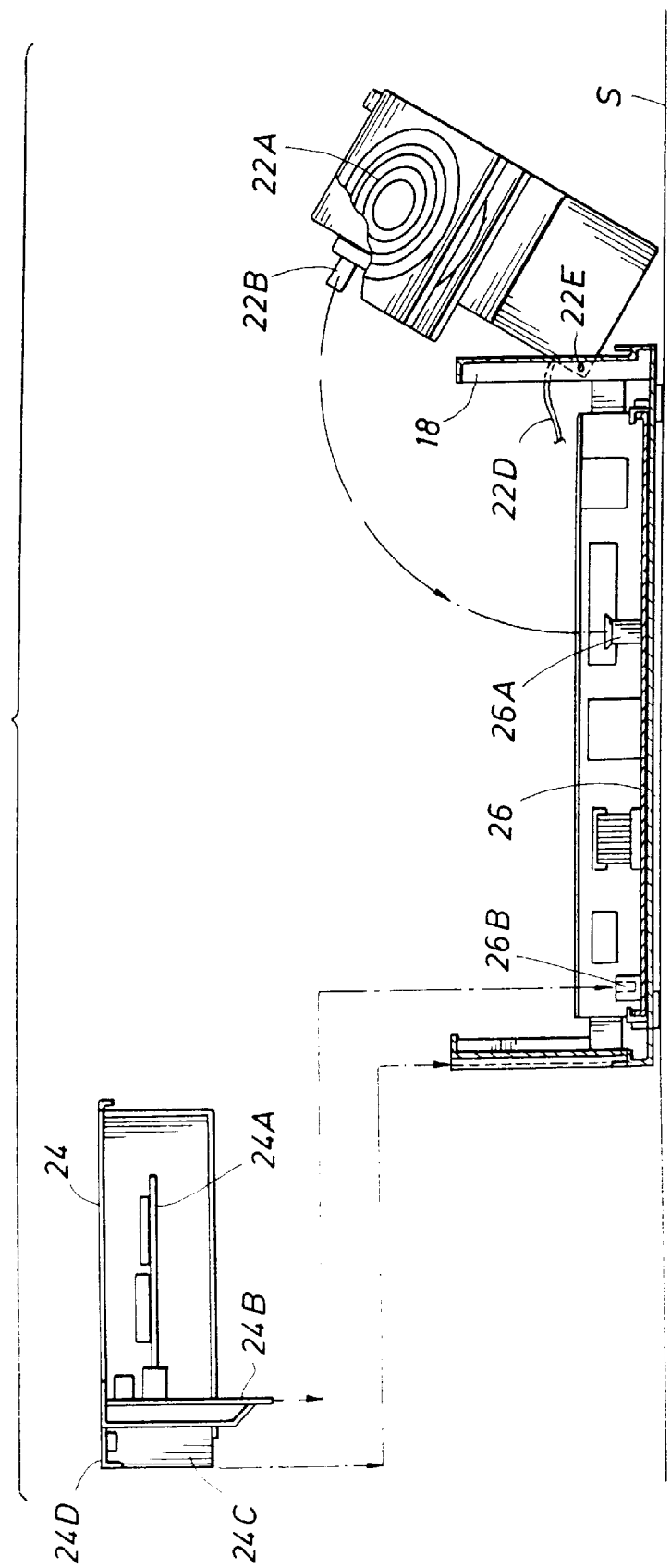

ALIGNED PIVOTING POWER SUPPLY TRAY AND GUIDED INPUT/OUTPUT TRAY FOR CONNECTION OF THE POWER SUPPLY AND INPUT/OUTPUT TO THE COMPUTER MOTHERBOARD

RELATED APPLICATIONS

This application is related to the following copending, concurrently filed, and commonly assigned United States patent applications which are hereby incorporated by reference:

U.S. patent application Ser. No. 08/876,672, entitled "Security and Space Saving Mounting Bracket for Computer Housing" to Phillip Prestigomo, Juan M. Perez and Francis A. Felcman;

U.S. patent application Ser. No. 08/876,836, entitled "Aligned Quick Disconnect Cover for a Computer System" to Francis A. Felcman and Juan M. Perez;

U.S. patent application Ser. No. 08/876,642, entitled "Aligned J-shaped Quick Disconnect System for Computer Drives" to Juan M. Perez and Francis A. Felcman;

U.S. patent application Ser. No. 08/876,783, entitled "Pivoting Power Supply Tray, Drive Tray and Removable Guided Input/Output Tray for Easy Access to and Removal of Sliding Motherboard Tray" to Juan M. Perez and Francis A. Felcman; and U.S. patent application Ser. No. 08/876,858, entitled "Computer Housing Securement System Below and Adjacent to a Sliding Motherboard Tray to a Work Surface via Feet" to Francis A. Felcman and Juan M. Perez.

BACKGROUND OF THE INVENTION

1. Field of the Invention

The present invention relates to a computer, and particularly to a system to electrically disconnect and connect a power supply and input/output boards to a motherboard.

2. Description of the Related Art

Though the computer industry has, over the years, been an area of innovation, improvements are desired in quick connection and disconnection of components of the computer system to increase accessibility to components of the computer system for additions, upgrades, repairs, maintenance and service.

Because of the desire to expand or add on to the features of a computer system and replace components with upgrades, such as more powerful microprocessors, and the need for repairs and maintenance service to the computer system, either by the user or a service center, quick accessibility of computer components have remained a concern. U.S. Pat. No. 5,491,611, assigned to the assignee of the present invention, proposes a computer system having a quick connect cover having a user panel and a service panel for access to circuit boards, power supply and drive units, such as floppy disk drives, hard drives and tape drives. U.S. Pat. No. 5,653,518 to Thomas T. Hardt, assigned to the assignee of the present invention, proposes quick release rail members for a computer drive unit with an arm including a detent movable relative to a slot in the computer frame. U.S. Pat. No. 5,491,611 and U.S. Pat. No. 5,653,518, are incorporated herein by reference for all purposes.

In the past, Compaq Computer Corporation of Houston, Tex., has addressed these concerns by manufacturing computer systems with a motherboard having a microprocessor positioned on a tray that is slidable relative to the frame of the computer housing. Additionally, Compaq Computer Corporation has manufactured a frame having a track member so that a tray having electronic components can be removably positioned with the frame but the electronic components were not automatically connected with a motherboard, or any other board, while positioning the tray in the frame track. Similarly, Compaq Computer Corporation has manufactured a drive tray that is pivotably attached to the frame of a computer housing. The drive tray, that holds a floppy disc drive and a hard drive, pivots upwardly approximately 45° to provide access to the drives. However, the drive tray is not positioned over a motherboard having a microprocessor, or any other printed circuit board and does not automatically electrically connect to the motherboard.

Therefore, it would be desirable to provide a system for aligned quick electrical disconnect and connect of electronic components with a motherboard. In particular, it would be desirable to have an aligned quick electrical connect of electronic components in a tray where upon moving the tray from the motherboard access position to an operating position, the electronic components in the tray are automatically electrically connected with the motherboard.

SUMMARY OF THE INVENTION

A system for automatically electrically connecting electronic components, such as an input/output board and a power supply, with a motherboard includes attaching in a tray with electronic components with a frame. In one embodiment, a tray is pivotably attached to a computer housing frame and a connector extends from the under side of the tray. As the tray is pivoted about its axis, the connector is engaged or disengaged from a connector fixedly mounted on the motherboard. The connector on the motherboard has a flexible funneled opening to facilitate insertion of the pivoting connector.

In another embodiment, a tray with electronic components can be quickly disconnected from the motherboard by lifting the tray straight up guided by frame tracks. By lifting the tray, a series of leads mounted on the tray are disengaged from the slot connector mounted on the motherboard.

Advantageously, a method for disconnecting electronic components from a motherboard in a computer frame is disclosed.

These features of the inventions are not necessarily the only features that will be disclosed in the specification. Additionally, the features of the invention have been described herein in summary, and it is not the intent of the drafter to disclose all features nor the true scope of the invention within this section. The specification will describe details of this invention for the understanding of those skilled in the art, and the claims will describe the actual scope of the invention.

BRIEF DESCRIPTION OF THE DRAWINGS

The objects, advantages and features of the invention will become more apparent by reference to the drawings which are appended hereto, wherein like numerals indicate like parts and wherein an illustrated embodiment of the invention is shown, of which:

FIG. 5 is a plan view, similar to FIG. 4, with the power supply tray and the input/output tray shown in the disconnected position; and FIG. 6 is a section view taken along line 6—6 of FIG. 5.

DETAILED DESCRIPTION OF THE PREFERRED EMBODIMENT

Figure 1:
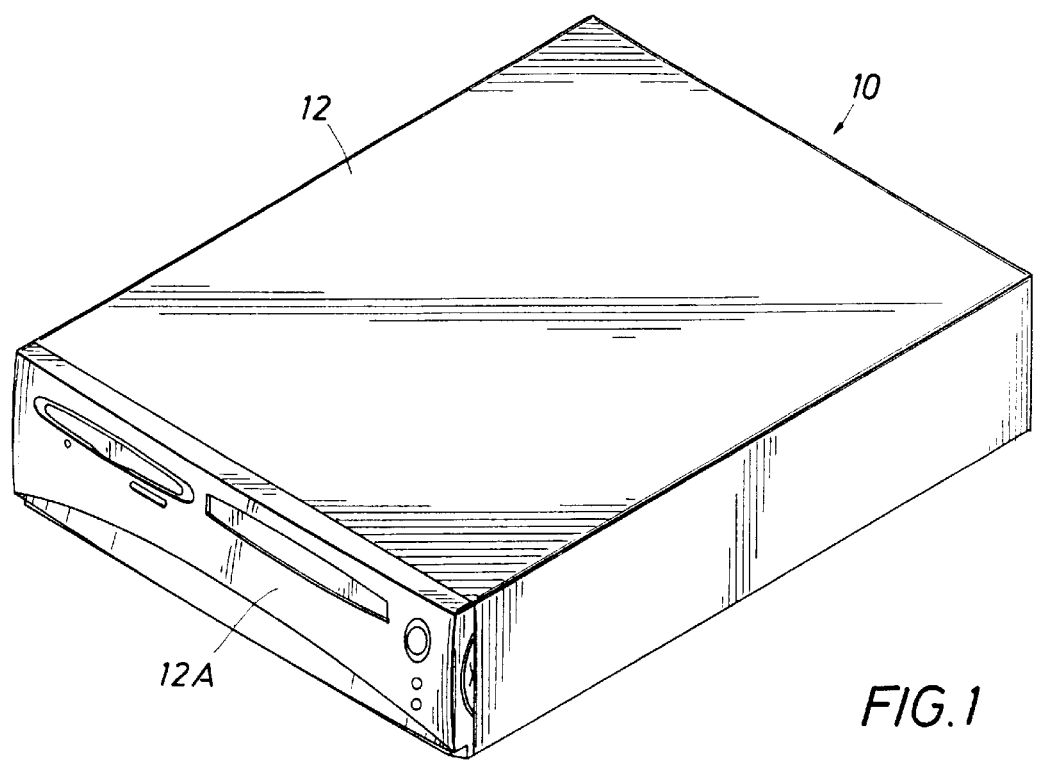
FIG. 1 is a perspective view of a computer housing of the present invention.

Turning now to the drawings, a system for automatic electrical connection of electronic components to a computer motherboard are shown in FIGS. 1–6. In particular, the computer includes a computer housing, generally indicated at 10, having a cover, generally indicated at 12. The computer housing 10 includes a cover 12 having a front face 12A. The front face 12A includes a plurality of openings 14 and 16 for electronic drive systems, such as a floppy disc drive and compact disc drive. In particular, the opening 14 provides an opening for insertion of a floppy disc into the floppy disc drive and the opening 16 allows the compact disc tray to extend from the computer housing 10.

Figure 4:
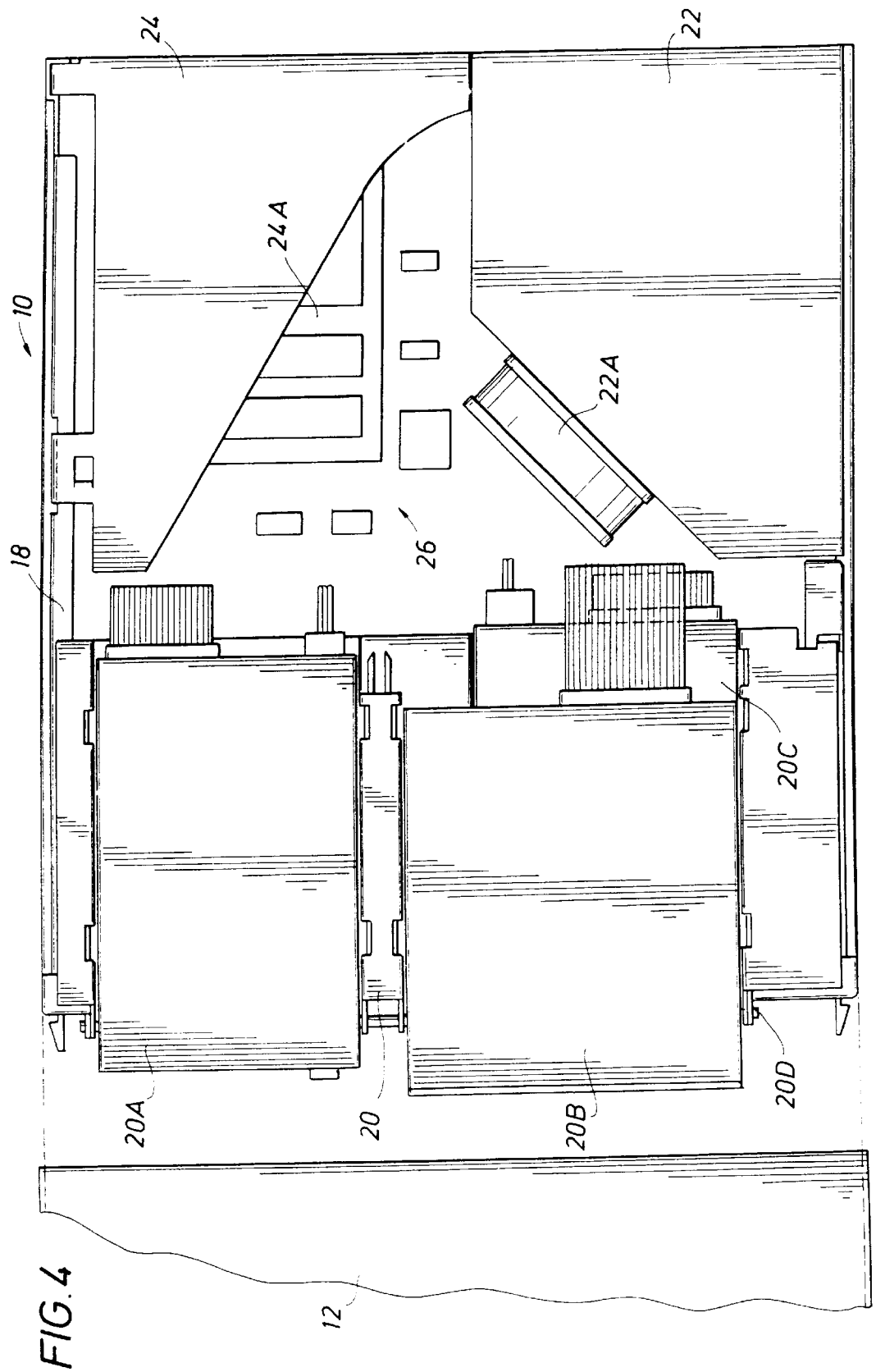
FIG. 4 is an enlarged plan view of the computer housing of the present invention upon removal of the cover from the frame to provide access to the trays, shown in the operating position.

Turning now to FIG. 4, the cover 12 is shown removed from the frame 18 to provide access to the drive tray 20, the power supply tray 22 and the input/output tray 24. The input/output tray 24 includes an input/output card 24A that extends parallel to the bottom plate of the frame 18. Additionally, as shown in FIGS. 5 and 6, an electronic card 24B extends perpendicular to the bottom plate of the frame 18 for connection with the motherboard, generally indicated at 26, as will be discussed below in detail.

The power supply tray 22, as best shown in FIGS. 4–6, supports a fan 22A used for cooling of the computer system in the computer housing 10. Additionally, as best shown in FIGS. 5 and 6, a elongated male connector 22B having a rigid plastic cover is provided beneath the power supply tray 22 and aligned for connection with a female connector 26A fixedly attached to the motherboard 26. The male connector 22B is in turn indirectly connected to the power supply power cord 22C as is known by those skilled in the art, connected to an external power source, such as a wall outlet (not shown). Additional power line connectors, such as line 22D, are provided for connection with other electronic components or systems in the computer housing 10, such as the floppy disc drive, the hard drive and the compact disc drive, as will be discussed below in detail. The male connector 22B is preferably a multiple connector and is aligned upon pivoting along the rod 22E connecting the power supply tray 22 to the frame 18. The female motherboard connector 26A has corresponding funneled connection ports for the male connector 22B.

Figure 2:
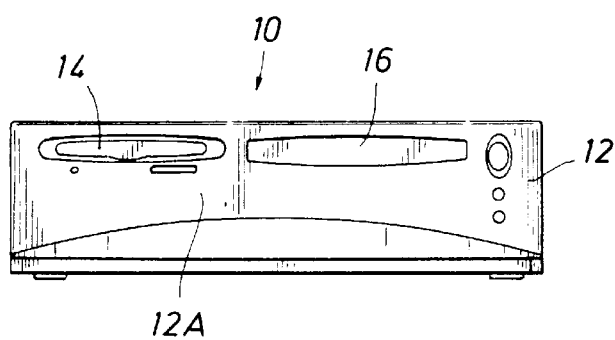
FIG. 2 is an elevational view of a front view of the computer housing of the present invention.
Figure 3:
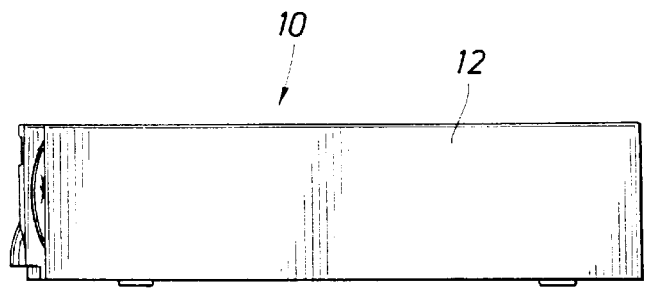
FIG. 3 is an elevational view of a side view of the computer housing of the present invention.

A plurality of drives are included on the drive tray 20, such as a floppy disc drive 20A that is aligned with the opening 14 in the front face 12A, as shown in FIG. 2, and the compact disc drive 20B that is aligned with the opening 16 of the cover 12 of the computer housing 10. Positioned below the compact disc drive 20B on the drive tray 20, is a hard drive 20C. While the drive tray 20 is pivotable about a rod 20D, pivoting the drive tray 20 does not disconnect the ribbon connectors 20E and 20F. These ribbon connectors would need to be disconnected at either of its ends to allow removal of the motherboard 26. As best shown in FIGS. 4–6, upon moving the power supply tray 22 from its operating and connected position, as shown in FIG. 4, to the motherboard access and disconnect position, as shown in FIGS. 5 and 6, the rigid male connector 22B positioned beneath the power supply tray 22 is automatically disengaged from the female connector 26A fixedly positioned and attached to the motherboard 26. As best shown in FIG. 6, the tray 22 is preferably pivoted approximately 120°, though any degree of pivoting could be used. However, preferably the tray 22 would be pivoted sufficiently to provide full access and exposure of the motherboard 26, as shown in the Figs.

Additionally, it is preferred that a blocking shoulder be provided on the frame 18 that would engage the metal surface of the tray 22 to prevent further pivoting of the tray relative to the frame 18 so that the tray 22 does not engage the surface S, as best shown in FIG. 6, upon which the computer housing frame 18 is positioned. However, it is contemplated that the tray 22 could be fully pivotable so that the tray 22 could engage the surface S, thereby blocking further pivoting. To engage the connector 22B with the connector 26A, a blind connection is made by pivoting the tray 22 about rod 22E so that the male connector 22B and female connector 26A are connected. Therefore, by moving the power supply tray 22 to its operating position, automatic electrical connection of the power supply components with the motherboard 26 is made.

The preferred embodiment includes a sliding motherboard tray 26C for the motherboard 26, though it is contemplated that the motherboard 26 could be fixed directly to the frame 18. If the motherboard 26 is provided on a slidable motherboard tray 26C, it will be necessary for the motherboard tray 26C to be fully retracted before the power supply tray 22 is pivoted to and the input/output tray is moved to the operating and connected position. The input/output tray 24 has downwardly extending members 24C and 24D that extend into frame tracks 18A and 18B, respectively. Upon insertion of tray 24 in the frame tracks 18A and 18B, the card 24B is guided into the elongated slot connector 26B on the motherboard 26, as best shown in FIGS. 5 and 6.

METHOD OF USE

Upon removing the cover 12 from the frame 18, the drive tray 20, power supply tray 22 and input/output tray 24 are accessible. If inspection or service is required on the motherboard 26, the appropriate trays can be pivoted or removed to provide access to the motherboard 26. If access to the memory card slots 30A and 30B are required the drive tray 20 can be pivoted forward, as shown in FIG. 5. While the preferred embodiment does not show an automatic electrical disconnect of the components or systems of the drive tray 20, it is contemplated that a connector could be provided to the drive tray for automatic blind connection with a corresponding connector on the motherboard 26. If the components on the motherboard, beneath the drive tray 20 is not needed, the drive tray 20 need not be pivoted. However, if the motherboard 26 below the power supply tray 22 and/or the input/output tray 24 is required, these trays can be moved to a board access and disconnect position, as discussed above. If it is desired to extend the motherboard 26 and its associated tray 26C, all the trays 20, 22 and 24 will be pivoted or removed and the remaining connectors to the motherboard, such as ribbon connectors 20E and 20F can be disconnected and the motherboard tray 26C slid from the frame 18.

Upon completion of inspection, replacement or repair of the motherboard 26, the tray 26C is inserted to a fully retracted position, connections are made from the drive tray systems, such as the ribbon connections 20D and 20E and connections from the power supply line 22D are made to the appropriate drives. The power supply tray 22 then is pivoted to its operating position and automatic electrical connection of the member 22B and the member 26A of the motherboard is made. The input/output tray 24 is then positioned so that the downwardly extending members 24C and 24D are received into their corresponding frame tracks 18A and 18B and upon insertion of the tray 24 downwardly the input/output card 24B is connected with the elongated slot connector 26B of the motherboard 26.

The disclosure for the patent applications having U.S. Ser. No. 08/876,672 for Security and Space Saving Mounting Bracket for Computer Housing; U.S. Ser. No. 08/876,836 for Aligned Quick Disconnect Cover for a Computer System; U.S. Ser. No. 08/876,642 for Aligned J-shaped Quick Disconnect System for Computer Drives; U.S. Ser No. 08/876,783 for Pivoting Power Supply Tray, Drive Tray and Removable Guided Input/Output Tray for Easy Access to and Removal of Sliding Motherboard Tray; and U.S. Ser. No. 08/876,858 for Computer Housing Securement System Below and Adjacent to a Sliding Motherboard Tray to a Work Surface via Feet, all filed on even date with the present application and assigned to the assignee of the present invention, Compaq Computer Corporation, are incorporated herein by reference for all purposes.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer, comprising:
   a computer housing having a frame,
   a printed circuit board positioned in said frame,
   a board connector fixed on said board, and
   a tray fixedly hinged to said frame holding electronic computer components and pivotable between an electrically disconnected position and an electrically connected position of said electronic computer components with said board, wherein said tray pivots to said disconnected position to provide access to said board.

2. A computer of claim 1 wherein said printed circuit board is removable when said tray is in the disconnected position.

3. A computer of claim 1 wherein said board connector is a female connector.

4. A computer of claim 1 wherein said tray pivots greater than 90°.

5. A computer of claim 4 wherein said tray pivots approximately 120°.

6. A computer of claim 1 wherein said tray includes a connector extending from its bottom surface, said tray connector is aligned for connection with said board connector.

7. A computer of claim 5 wherein the full length of said tray connector is rigid.

8. A computer of claim 7 wherein said tray connector is an elongated male connector.

9. A computer of claim 6 wherein said board connector has multiple contacts.

10. A computer of claim 9 wherein said tray includes corresponding multiple contacts corresponding to said board connector contacts.

11. A computer of claim 1 further comprising said board being below said tray and wherein when said tray is in said disconnected position access is provided to said board.

12. A computer of claim 1 wherein said board connector having an angled and enlarged opening for directing connection with said electronic computer components.

13. A computer of claim 1 wherein said electronic computer components are power supply components.

14. A computer of claim 1 wherein said electronic computer components are input/output components.

15. A computer, comprising:
   a computer housing having a frame,
   a motherboard positioned in said frame,
   a board connector fixed on said board, and
   a tray fixedly hinged to said frame and positioned above said motherboard holding electronic computer components, said tray pivotable between an electrically disconnected position, wherein said motherboard is removable by sliding when said tray is in the disconnected position, and an electrically connected position of said electronic computer components with said board, said tray includes a rigid connector extending from its bottom surface, said tray connector is aligned for connection with said board connector.

16. Method for disconnecting electronic components from a printed circuit board positioned in a computer frame, comprising the steps of:
   positioning the electronic components in a tray positioned above said board,
   pivoting said tray fixedly pivotable attached to the frame, and
   disconnecting a connector from said electronic components in said tray from a connector in said board when pivoting said tray.

17. Method of claim 16, further comprising the step of:
   blocking further pivoting of said tray after disconnection of said electronic components from said board.

18. Method of claim 17, further comprising the step of
   sliding said board from said frame after the steps of disconnecting and blocking.

19. Method of claim 18, further comprising the step of
   blocking said tray from further pivoting after said tray has rotated 120°.

* * * * *

UNITED STATES PATENT AND TRADEMARK OFFICE
CERTIFICATE OF CORRECTION

PATENT NO. : 5,973,918                                           Page 1 of 1
DATED      : October 26, 1999
INVENTOR(S) : Francis A. Felcman et al.

It is certified that error appears in the above-identified patent and that said Letters Patent is hereby corrected as shown below:

<u>Column 5,</u>
Line 3, before "22B" delete "member" and insert -- connector --.
Line 3, before "26A" delete "member" and insert -- connector --.

<u>Column 6,</u>
Line 1, delete "claim 5" and insert -- claim 6 --.

Signed and Sealed this

Second Day of May, 2006

JON W. DUDAS
*Director of the United States Patent and Trademark Office*